(12) United States Patent
Bjørneklett (10) Patent No.: US 10,644,645 B2
(45) Date of Patent: May 5, 2020

(54) SOLAR POWER PLANT

(71) Applicant: Ocean Sun AS, Lysaker (NO)

(72) Inventor: Børge Bjørneklett, Eiksmarka (NO)

(73) Assignee: OCEAN SUN, AS, Lysaker (NO)

( * ) Notice: Subject to any disclaimer, the term of this patent is extended or adjusted under 35 U.S.C. 154(b) by 0 days.

(21) Appl. No.: 16/306,493

(22) PCT Filed: May 31, 2017

(86) PCT No.: PCT/NO2017/050139
§ 371 (c)(1),
(2) Date: Nov. 30, 2018

(87) PCT Pub. No.: WO2017/209625
PCT Pub. Date: Dec. 7, 2017

(65) Prior Publication Data
US 2019/0131919 A1 May 2, 2019

(30) Foreign Application Priority Data

May 31, 2016 (NO) .................................. 20160927
May 3, 2017 (NO) .................................. 20170728

(51) Int. Cl.
*H01L 31/042* (2014.01)
*H02N 6/00* (2006.01)
(Continued)

(52) U.S. Cl.
CPC .............. *H02S 20/30* (2014.12); *F24S 10/17* (2018.05); *F24S 20/70* (2018.05); *H02S 10/12* (2014.12);
(Continued)

(58) Field of Classification Search
CPC .......... H02S 20/30; H02S 30/20; H02S 30/10; F24S 20/70; F24S 10/17
See application file for complete search history.

(56) References Cited

U.S. PATENT DOCUMENTS

| 2007/0234945 A1 | 10/2007 | Khouri et al. | |
| 2008/0029148 A1* | 2/2008 | Thompson | H02S 20/00 136/244 |

(Continued)

FOREIGN PATENT DOCUMENTS

| CN | 102916621 A * | 2/2013 |
| CN | 102916621 A | 2/2013 |

(Continued)

OTHER PUBLICATIONS

English machine translation of CN102916621A (Year: 2020).*

(Continued)

*Primary Examiner* — Angelo Trivisonno
(74) *Attorney, Agent, or Firm* — Snell & Wilmer, L.L.P.

(57) ABSTRACT

An offshore photovoltaic power plant (100) comprising a pliable mat (2) configured to be arranged on a surface (33) of a body of water, the mat (2) having a plurality of photovoltaic modules (1) fixed thereon. The photovoltaic modules may be marinized and equipped with a buoyant rigid aluminium structure which prevents mechanical damage to the cells. The rigid backside structure may also serve as an efficient heat sink by direct thermal conduction from the solar cells to the pliable mat. There is also provided a fish farm, an offshore power plant, a method of constructing an offshore photovoltaic power plant and a method of installing a floating photovoltaic power plant.

23 Claims, 11 Drawing Sheets

(51) Int. Cl.
  *H02S 20/30* (2014.01)
  *H02S 30/10* (2014.01)
  *H02S 40/42* (2014.01)
  *H02S 10/12* (2014.01)
  *F24S 20/70* (2018.01)
  *F24S 10/17* (2018.01)
  *H02S 30/20* (2014.01)

(52) U.S. Cl.
  CPC .............. *H02S 30/10* (2014.12); *H02S 30/20* (2014.12); *H02S 40/425* (2014.12); *Y02A 40/966* (2018.01); *Y02E 10/44* (2013.01); *Y02E 10/47* (2013.01)

(56) References Cited

U.S. PATENT DOCUMENTS

| | | | |
|---|---|---|---|
| 2010/0065104 A1* | 3/2010 | Baruh | B63B 15/0083 136/251 |
| 2010/0294331 A1* | 11/2010 | Carnation | H02S 30/20 136/244 |
| 2010/0307566 A1* | 12/2010 | Hinderling | H01L 31/0547 136/246 |
| 2010/3077566 | 12/2010 | Hinderling | |
| 2012/0242275 A1 | 9/2012 | Kokusho et al. | |
| 2013/0146127 A1* | 6/2013 | Lunoe | B63B 35/44 136/251 |
| 2014/0224165 A1 | 8/2014 | Veloso et al. | |
| 2014/0290721 A1 | 10/2014 | Haarburger | |
| 2015/0162866 A1 | 11/2015 | Yun et al. | |
| 2016/0156304 A1* | 6/2016 | Smadja | H02S 20/00 136/251 |
| 2017/0310272 A1 | 10/2017 | Julian et al. | |

FOREIGN PATENT DOCUMENTS

| | | |
|---|---|---|
| DE | 3919125 | 12/1990 |
| DE | 3919125 A1 | 12/1990 |
| DE | 198 57 174 | 6/2000 |
| DE | 19857174 A1 | 6/2000 |
| DE | 19908645 A1 | 8/2000 |
| DE | 10 2011 056284 | 6/2013 |
| DE | 102011056284 A1 | 6/2013 |
| DE | 10 2012 108740 | 3/2014 |
| DE | 201012108740 A1 | 3/2014 |
| EP | 2299499 | 3/2011 |
| EP | 2299499 A1 | 3/2011 |
| KR | 20110004967 | 1/2011 |
| KR | 20110004967 A | 1/2011 |
| KR | 101101316 B1 | 12/2011 |
| KR | 1011013316 | 12/2011 |
| KR | 101612832 | 4/2016 |
| KR | 101612832 B1 | 4/2016 |
| WO | 2014121782 A1 | 9/2014 |
| WO | WO2014/131782 | 9/2014 |

OTHER PUBLICATIONS

Expert Report dated Aug. 12, 2019 issued by the Chilean National Institute of Industrial Property in the Chilean Patent Application No. 201803350.
PCT: International Search Report dated Sep. 7, 2017 in PCT Application No. PCT/NO2017/050139.
PCT: Written Opinion of International Search Authority (EPO) dated Sep. 7, 2017 in PCT Application No. PCT/NO2017/050139.
Search Report dated Dec. 31, 2016 issued by Norway Patent Office in Norway Patent Application No. 20160927.
Search/Examination Report dated Jul. 30, 2018 issued by U.K. Intellectual Property Office in Great Britain Patent Application No. GB1810594.0.
Notification of First Office Action dated Dec. 25, 2019 in Chinese Application No. 201780031888.7.

* cited by examiner

SOLAR POWER PLANT

CROSS-REFERENCE TO RELATED APPLICATIONS

This application is a U.S. National Phase filing under 35 U.S.C. § 371 of PCT Application Serial No. PCT/NO2017/050139 filed on May 21, 2017, which claims priority to Norway Patent Application Serial No. 20170728 filed on May 3, 2017 and also claims priority to Norway Patent Application Serial No. 20160927 filed on May 31, 2016 the contents of each of the respective applications are incorporated herein by reference in their entireties.

The present invention relates to renewable energy production, and more specifically to apparatus and methods relating to floating solar power plants.

BACKGROUND

Floating photovoltaic (PV) solar power systems are known, although not extensively used at present. Such systems are typically deployed on calm water, i.e. on lakes, hydroelectric power dams, water reservoirs, rivers, or the like. Some of the challenges associated with floating solar power systems include exposure to loads from waves and currents, challenging and labour-intensive deployment of the plant (or components thereof), and problems associated with access for system maintenance and cleaning (e.g. salt or solid particles accumulating on plant surfaces). Currently available floating solar power systems are also limited by their relatively high cost.

Examples of prior art which may be useful for understanding the background include: US 2012/0242275 A1, which describes a large-scale ocean mobile solar power generation system; US 2015/0162866 A1, which describes a supporting device for a solar panel; US 2014/0224165 A1, which describes a device for supporting a photovoltaic panel; and KR 1011013316 B and KR 101612832 B, which describe solar cells arranged on floating devices.

At present there are both technical and economic challenges associated with floating PV power plants. There is consequently a need for improved systems and methods for such renewable power generation for a variety of applications and purposes. The present invention aims to provide improved apparatuses and methods relating to floating solar power plants, providing advantages and/or remedying current challenges or disadvantages associated with known systems and techniques.

SUMMARY

In an embodiment, there is provided an offshore photovoltaic power plant comprising a pliable mat configured to be arranged on a surface of a body of water, the mat having a plurality of photovoltaic modules fixed thereon. Further alternative and/or particularly advantageous embodiments are outlined in the appended claims.

BRIEF DESCRIPTION OF THE DRAWINGS

Illustrative embodiments will now be described with reference to the appended drawings, in which.

DETAILED DESCRIPTION

Many fixed or floating offshore units such as oil and gas production platforms, drilling or processing installations require considerable amounts of energy to operate. Other power demanding installations include large fish farms, or populated islands that are located far from the grid. The energy demand for these sites is commonly supplied via diesel or gas turbine generators. Due to the high energy consumption originating from fossil fuel sources and the subsequent release of carbon dioxide, the activity has raised considerable debate among environmentalists and politicians. Additionally, the cost of energy is an important consideration by operators and owners of such installations.

According to embodiments described herein, there is provided a floating renewable power generation installation suitable for connection to a regular, land-based electricity grid through a cable, or for standalone, off-grid power generation. Embodiments may be employed in remote or near-shore offshore locations or on inland waters and can, for example, be designed to replace fossil fuel based generators or power plants and thereby reduce the $CO_2$ footprint of the electric power generation. For example, many densely populated areas, including many megacities, are located near shore. In such areas, the available area or useable rooftops for conventional renewables, such as wind power and solar, is very limited. According to embodiments described herein, significant contributions can be made to renewable power generation in such areas, at moderate cost and with high operational reliability.

Embodiments of the system are suitable for a variety of applications, and can, for example, be designed to replace or provide a substantial part of the energy demand during daytime in the spring, summer and autumn. For example, PV may work well in hybrid power systems where flexible fuel based generators easily can level out the typical irregularities that occur with the shifting output from solar energy systems due to clouds and the position of the sun. Alternatively, batteries may also be used for energy storage.

The standard 60 or 72 cell photovoltaic module for use in large power plants is not directly designed to withstand mechanical forces that may occur from wave slamming and/or strong winds at sea. Moreover, the modules normally require solid racks that are securely fixed to the ground. Installation racks could in theory be arranged on barges or other floating vessels, but not without a substantial cost penalty compared to e.g. the large scale land based installations. Embodiments described herein mitigate such problems associated with conventional technology.

Figure 1:
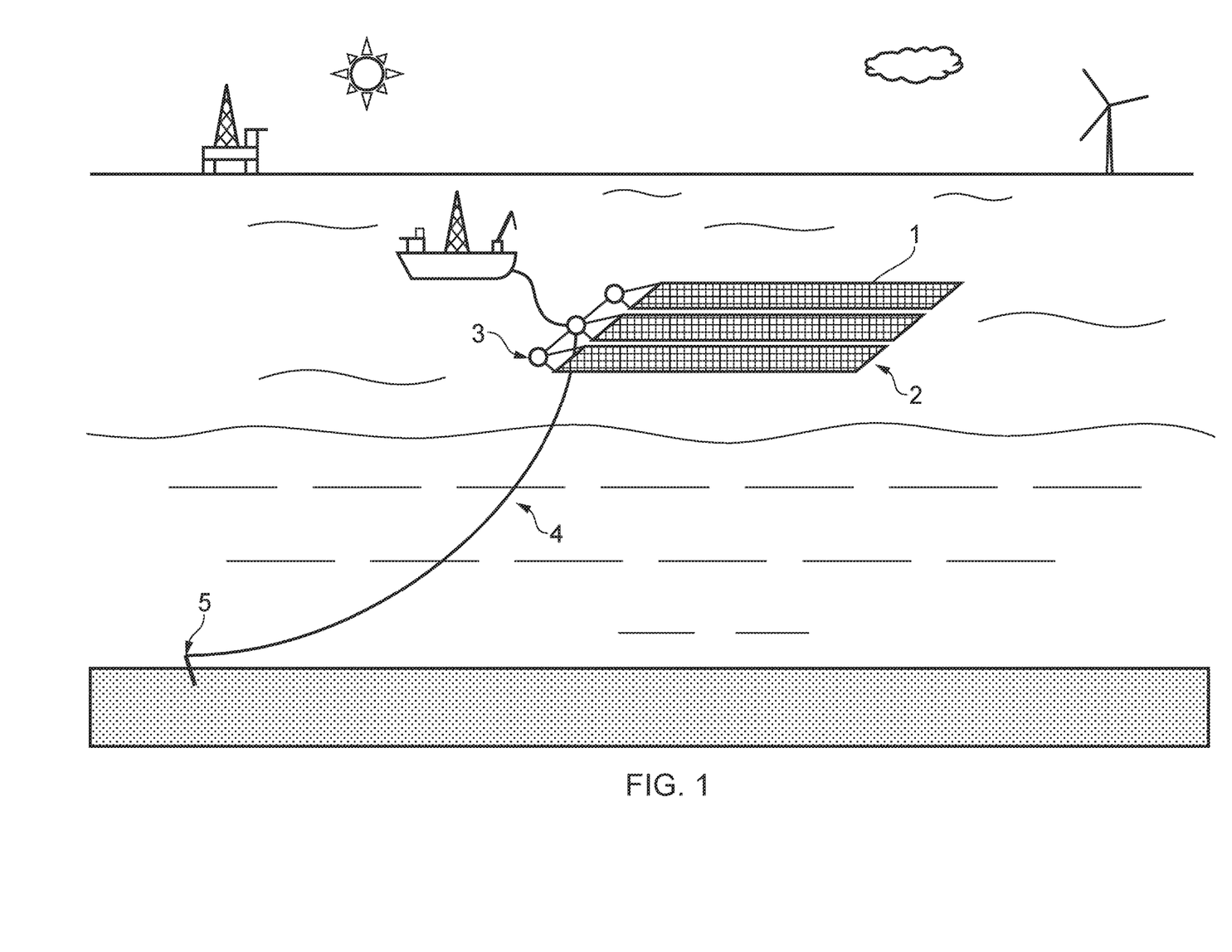
FIG. 1 shows a diagrammatic view of photovoltaic system floating in the sea.

FIG. 1 (not to scale) shows an embodiment, comprising interconnected PV modules 1 installed onto elongated flexible floating mats 2. The mats 2 are attached to buoys 3 which are moored, for example with chains, polyester or nylon ropes 4, which again are secured to the seabed by anchors 5.

Figure 2:
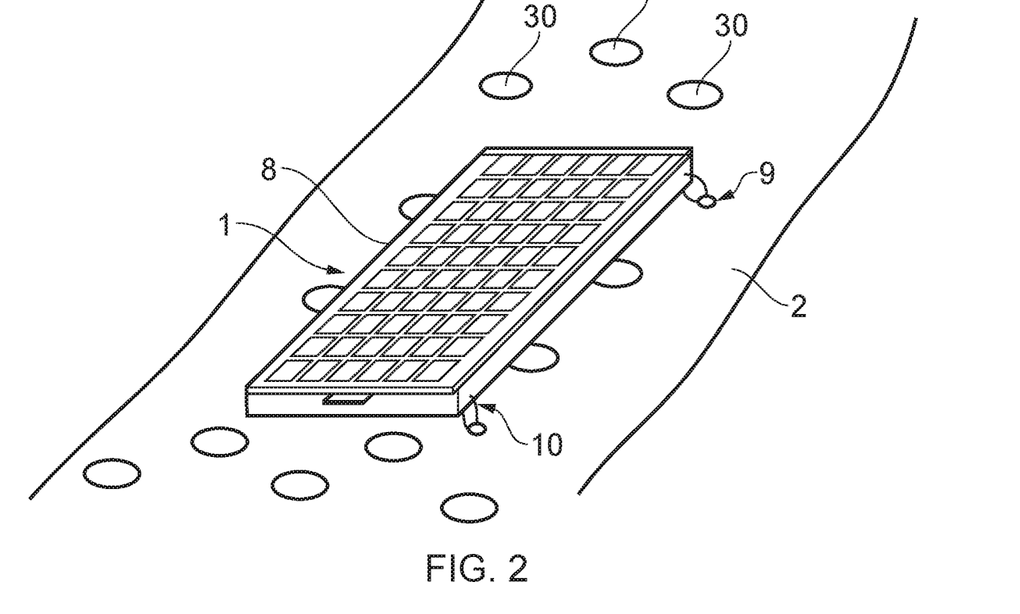
FIG. 2 shows a PV module attached to perforated floatation mat.

FIG. 2 (not to scale) shows a PV module 1 having a frame 8 with attachment points for attachment to floatation mat 2 with pad eyes 9 using shackles 10. The mat 2 may be perforated with holes 30 such as to drain any water accumulating on the upper side of the mat 2.

Figure 3:
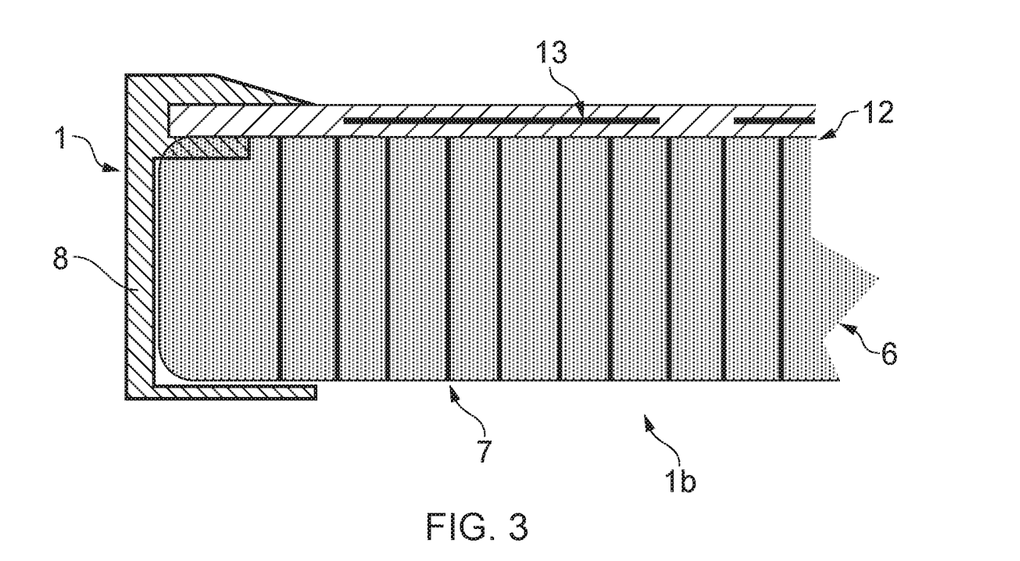
FIG. 3 shows a cross section of a PV module with stiffening element containing a heat sink.

FIG. 3 shows a cross-section of one embodiment of a PV module 1 suitable for use with a mat 2 as described above. The PV module 1 has a laminate 12 encapsulating silicon based solar cells 13. The module 1 is designed with a lightweight sandwich composite core material 6 and heat sink elements 7. The heat sink elements 7 are arranged to facilitate heat dissipation from the backside of the laminate 12 to the sea.

Figure 4:
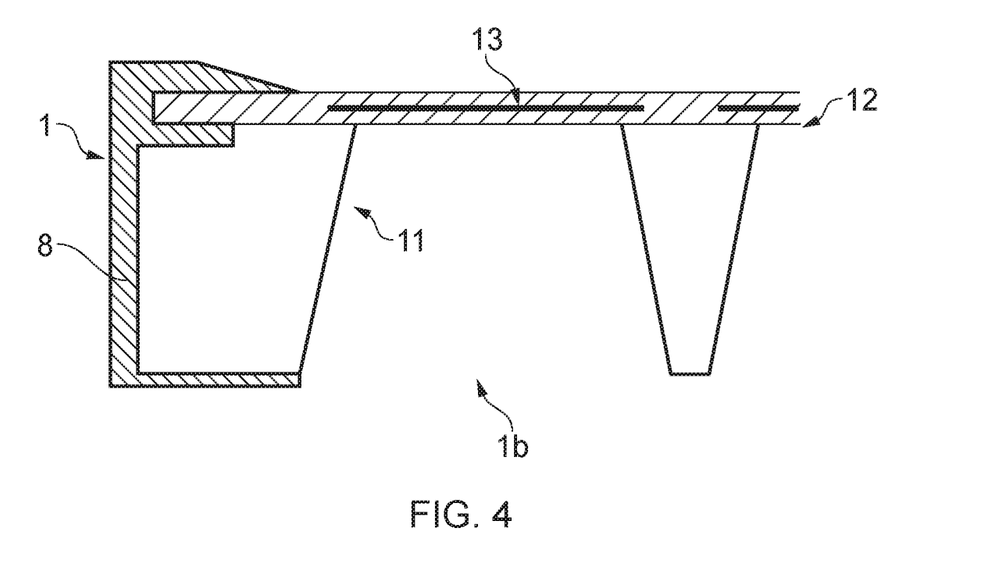
FIG. 4 shows a cross section of a PV module with a stiffening cooling element consisting of a corrugated profile.

FIG. 4 shows a cross-section of a second embodiment where the heat sink is made of aluminium profile or corrugated heat sink plates 11 fixed to an aluminium frame 8 of the module 1.

The embodiments described above are based on multiple stiff and ruggedized PV modules 1 which are interconnected in strings or matrices, and installed onto large, thin, flexible mats or strips 2 which float in the sea. The substrate mats or elongated strips 2 are fully flexible, essentially follows the motion of the sea waves and generally display a so-called hydro-elastic behaviour. Chopped waves and sea spray is effectively prevented by the presence of the mats 2, which may cover large areas. A plurality of mats 2 may also be interconnected.

The mats 2 may or may not be perforated, have recesses, one-way valves, pumps or other arrangements to allow drainage of accumulated water (such as rain water). The mats 2 may alternatively be made of a net, i.e. have relatively large openings. FIG. 2 shows an example of such perforations 30 arranged transversely through the mat 2. If desirable, the buoyancy of the mats 2 can be designed to maintain a thin film of water on top of parts of or substantially the entire mat 2. This may be beneficial for cooling of the mat 2 itself and/or the PV modules 1.

Figure 5:
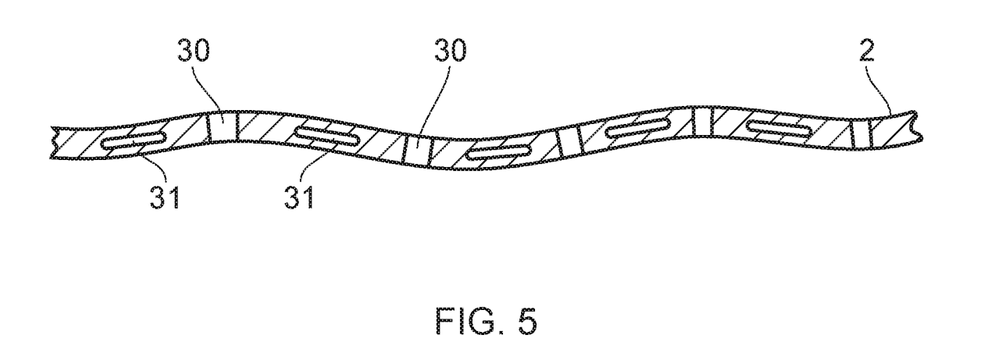
FIG. 5 shows a cross section of a mat according to one embodiment.

The mats 2 can be constructed from sheet, a net, woven textile, film or plate from e.g. polyethylene, polypropylene, polyurethane, EVA, synthetic rubber or copolymers which can be fabricated in large sections. Alternatively, the fabric may also be multi-layered and or partially inflated by pockets or elongate tunnels containing gas, water having low salinity, buoyant solids, oils, jellies, foam or other components. This is illustrated schematically in FIG. 5, showing a cross-sectional cut of the mat 2 shown in FIG. 2, with perforations 30 and pockets 31 comprising a fluid or a solid material with a density lower than that of water, i.e. lower than 1 kg/dm$^3$. The pockets 31 may be formed as elongate tunnels along a length of the mat 2.

The PV modules 1 are fixed to the mats 2 with e.g. quick lock carabiners or shackles 10 which are attached to pad eyes 9 that are securely welded or integrated in the mats 2. Alternative fixation means can be, for example, straps, sewed pockets, welded brackets, interconnecting guiding rails etc. Many fixation methods can be envisaged within the scope of the present invention.

Advantageously, the frame 8 and module 1 structure are designed with a threefold purpose: firstly to provide improved stiffness and prevent breakage of the solar cells, secondly to facilitate thermal dissipation by heat conduction to the colder mat 2 and the water, and lastly, to provide an airtight enclosure and thereby optionally make the marine module buoyant.

The relatively thin silicon based solar cells in PV modules 1 are by nature brittle and vulnerable to fracturing. In order to eliminate the problem of fracturing caused by repeated motion generated by sea waves and/or slamming forces, the modules 1 can be reinforced. Reinforcement can, for example, be achieved by means of the design of the supporting frame 8 and/or by adding a stiffening core material to the back side 1b of the module 1. The heat sink elements 7 and/or the heat sink plates 11 may also be designed to provide structural strength within the module 1. It is thus possible to create a very stiff module 1, increasing the bending resistance and the effective bending radius of the laminated solar cells and hence avoid excessive damage. Such reinforcement may, for example, be used to avoid damage and ensure system reliability in harsh, offshore areas. In less demanding locations, such as inland waters, the requirements for reinforcement may be relaxed.

Conventionally, the back side of the PV module 1 is open to air circulation in order to avoid thermal insulation which can cause the cells to heat up excessively and lose their electrical efficiency. In one embodiment, this problem is addressed by letting the back side 1b be thermally connected to the sea water. This can be achieved by providing an aluminium heat sink 7,11 attached to, or forming part of the back side 1b of the module 1. The favourable effect of water cooling of solar cells as such is already well established and known in the industry. The stiffening core material, which also acts as a heat sink 6 may also be equipped with cooling channels to allow thermal dissipation directly to water. The composite core material 6 may also preferably be made of a material with a beneficial thermal conductivity.

The offshore PV array can be designed with enough buoyancy to float, with the back side of the PV modules 1 partially submerged, enabling heat transfer with the water. The modules 1 may or may not be buoyant themselves. The module strings 2, or multiple strings forming an array, are moored to the seabed by anchors 5, chains and in combination with light weight rope made of e.g. polyester or nylon. Alternative means of mooring is also possible, for example the module strings 2 can be fixed to land, e.g. in near-shore or dam applications. Buoys 3 are also installed to prevent the PV installation to be dragged under by sea current and/or wave drift forces. The geometry as well as the number and size of the anchors 5 and buoys 3 can be designed to minimise lateral drift forces. Adequate buoyancy and fixation points for anchoring can also be provided by one or several endless tubular elements encompassing the perimeter of the mat. The buoys 3 may also be equipped with appropriate lanterns to mark the location of the power plant for seafarers.

Quick connectors between the mats 2 and the modules 1 can be used for easy attachment of the PV modules 1 which enable rapid and cost efficient installation by deploying the PV modules 1 attached to the flexible mats 2, strips of mat or hoses on to the surface from a suitable vessel or from a land-based location such as a quayside. The modules 1 are stackable and can easily be deployed or retracted in case of extreme weather. The PV modules 1 are interconnected electrically using high quality, non-degradable contacts capable of submersion. Furthermore, the electrical cables can optionally be mechanically attached to the rigid module 1 in order to strengthen the stress relief properties beyond what is offered by regular junction box terminals.

Depending on the size of the PV array, number of strings 2, designed peak wattage etc., the PV system is connected to inverters capable of transforming the power to the intended onshore or offshore consumer. If the inverters and transformers or not installed directly at an end user's offshore facility, they can be encapsulated and made buoyant. The latter is particularly relevant for large area installation with e.g. multiple string inverters and where the power is delivered through a main power cable to the end user.

In one embodiment, preassembled strings of modules can be stacked on deck of vessels or barges for easy deployment or retraction e.g. for winter, in order to avoid the most extreme weather and to preserve the system when the power generating potential is lower due to limited daylight. Alternatively, the PV system can be seasonably operated and towed to more benign waters e.g. fjords during winter. In more equatorial waters the installations can possibly be operated under similar insolation conditions year round. The horizontal arrangement of the modules 1 when deployed is ideal for near vertical insolation around equatorial waters, but the floatation system or the modules themselves can alternatively be fabricated with fixed inclination, e.g. 20-30 degrees for optimisation in the northern or southern hemisphere. Tilting of the modules can also be achieved by elevating the top surface of the mat along lines or ridges facilitated by tunnels or sections with higher buoyancy. Similarly, it is possible to provide recesses or trenches using more dense material, e.g cable or chains. Slight inclination of the modules can sometimes be favourable for guiding rain water and or enabling natural cleaning of the modules.

The photovoltaic system may also be combined with batteries and preferably be used in combination with low energy density redox flow battery technology.

Several large arrays will have a calming effect on the sea in the vicinity of the offshore installations, similar to that of oil slicks or grease ice in troubled waters. The PV system which essentially covers the surface of the sea will prevent wind induced breaking of waves, ripples and chopped sea, while the individual PV modules will experience slow heave motion when subjected to large swells. The PV system according to embodiments described herein may therefore favourably be combined with other offshore renewable power generators, such as wind turbine generators.

Figure 6:
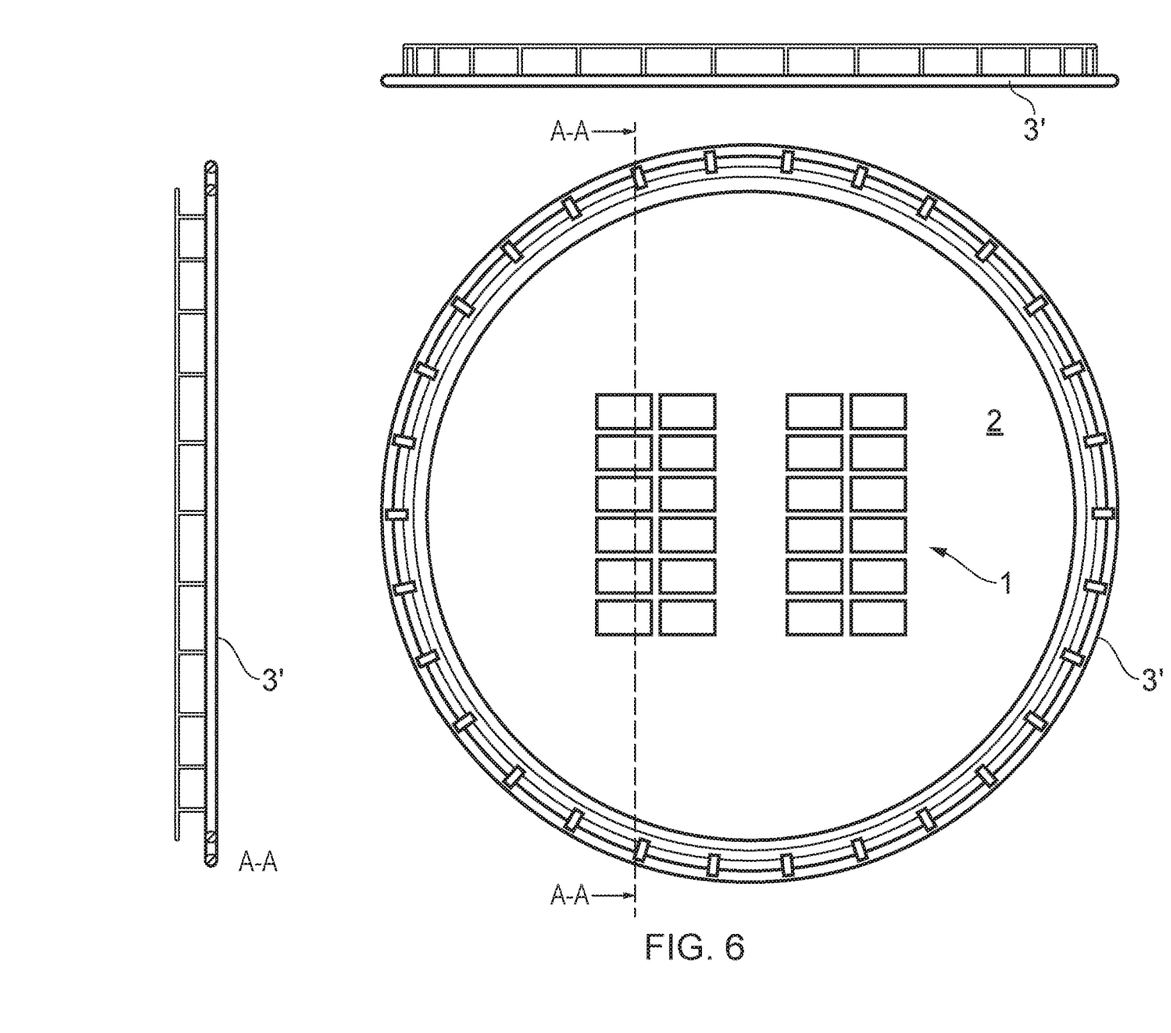
FIG. 6 shows a photovoltaic system according to an embodiment.
Figure 7A:
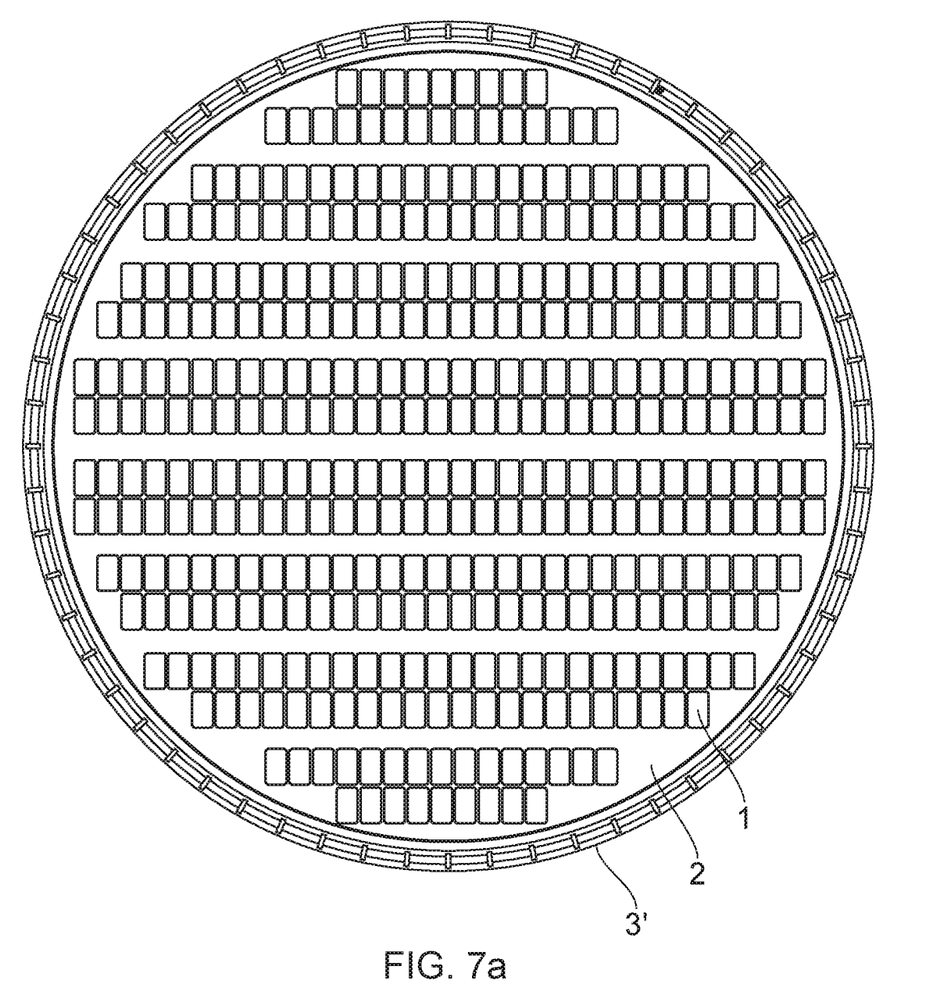
FIGS. 7a-7c show photovoltaic system according to an embodiment.
Figure 7B:
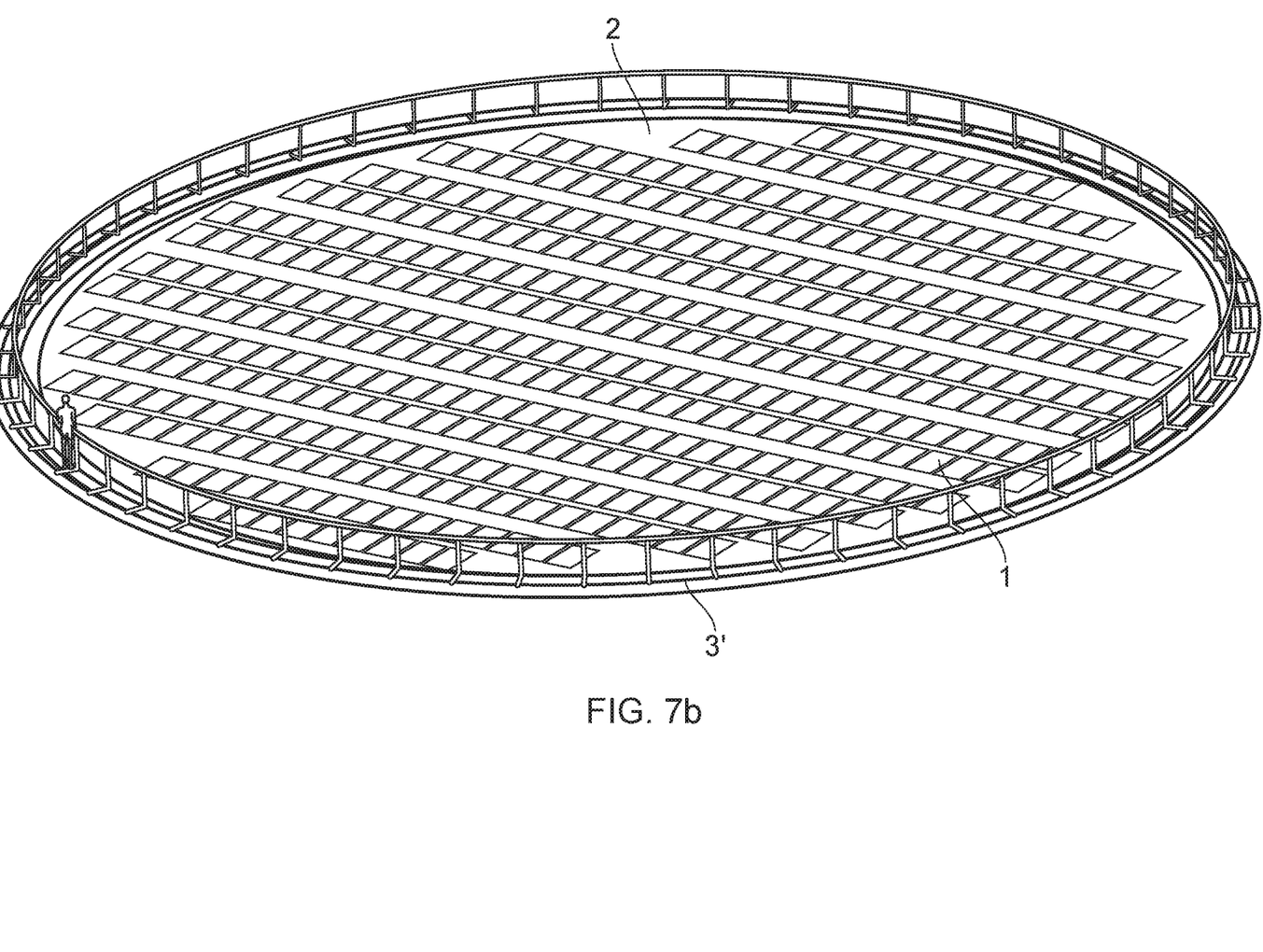
Figure 7C:
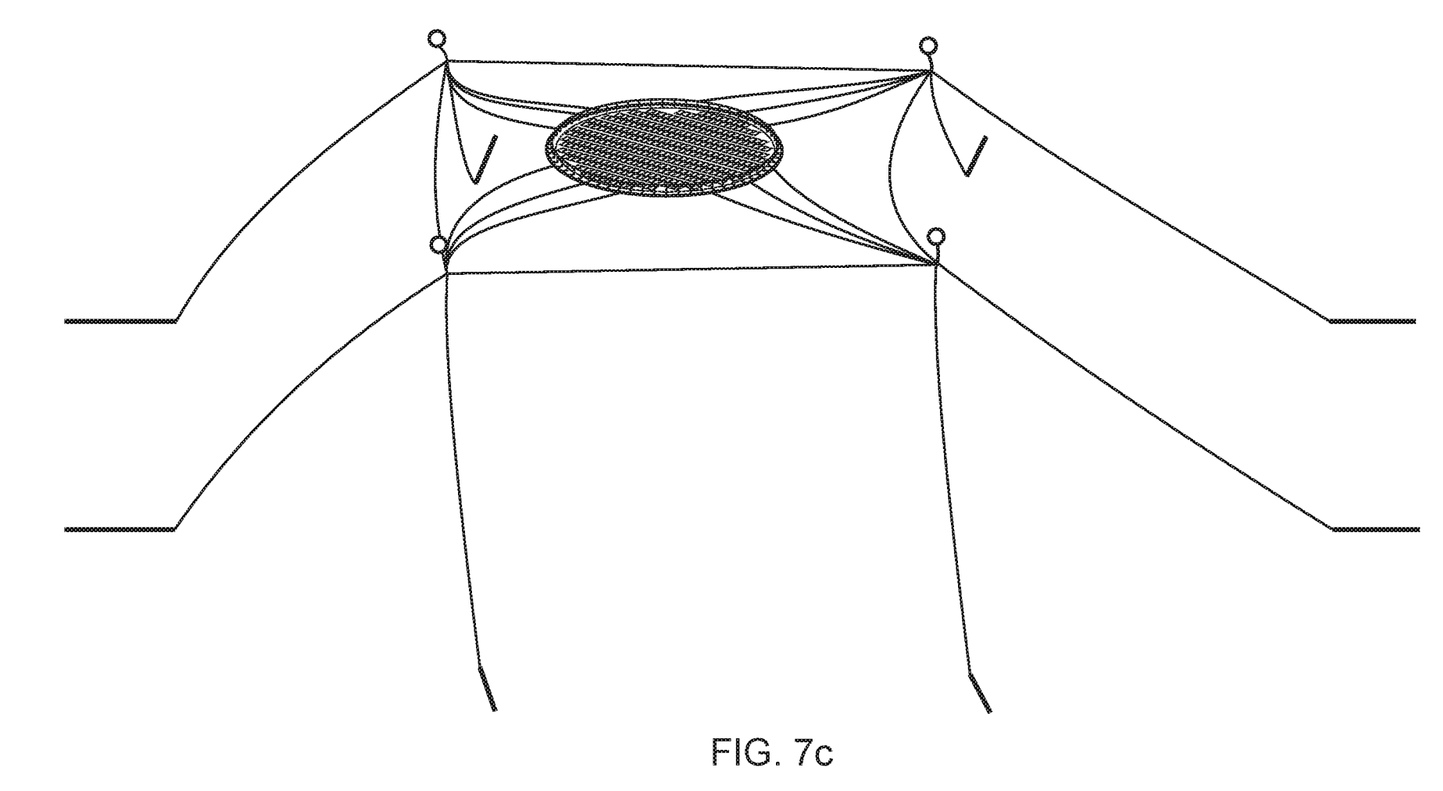

FIGS. 6 and 7a-7c show other embodiments of an offshore photovoltaic power plant, wherein the floatation element 3' is an endless, elongated floatation element which surrounds the mat 2. FIG. 6 shows a top view, a cut view (left hand side) and a side view (top of the figure), respectively. The floatation element 3' may be substantially circular, as shown in this example, or it may have a different form. The modules 1 are fixed to the mat 2 inside the floatation element 3'. FIGS. 7a-c show an alternative embodiment where the floatation element 3' is larger in diameter, and more modules 1 are fixed to the mat 2. FIG. 7c shows the power plant moored with a four point mooring arrangement. By providing an endless, elongated floatation element 3' to which the mat 2 is connected, the form and shape of the mat 2 is better ensured during operation, and the floatation element 3' provides protection from wind and/or waves. The installation may optionally be equipped with additional wave breakers positioned outside the perimeter of the flotation element in order to reduce wave slamming or flooding of the mat in rough sea.

In one embodiment, there is provided a fish farm comprising an offshore photovoltaic power plant according to any of the embodiments described above. Providing a fish farm with an offshore photovoltaic power plant provides advantages in that the power production profile of the power plant will match the power demand from the fish farm well; electric power required to operate feeding systems in the fish farm is generally mainly required at daytime, when the photovoltaic production will be highest. The same is valid for seasonable changes at high latitudes, where e.g. salmon's appetite is well matched with the extended daylight in the summer and subsequent high PV power generation.

By providing the offshore photovoltaic power plant with an endless, elongate floatation element 3' which surrounds the mat 2, mooring of the power plant at the fish farm is made easier, since the fish farm in many cases will have arrangements in place to moor such endless, elongate floatation elements.

Figure 8A:
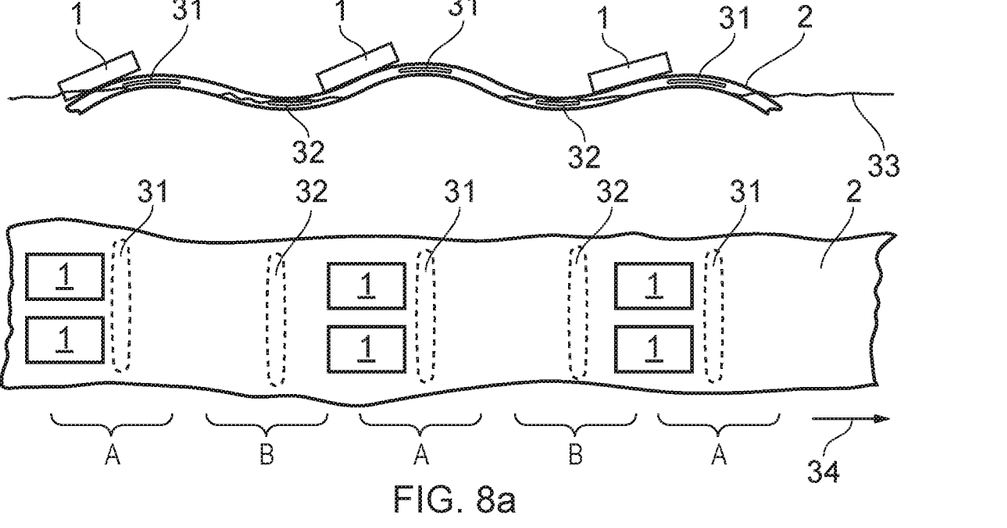
FIG. 8a-8b show a photovoltaic system according to an embodiment.
Figure 8B:
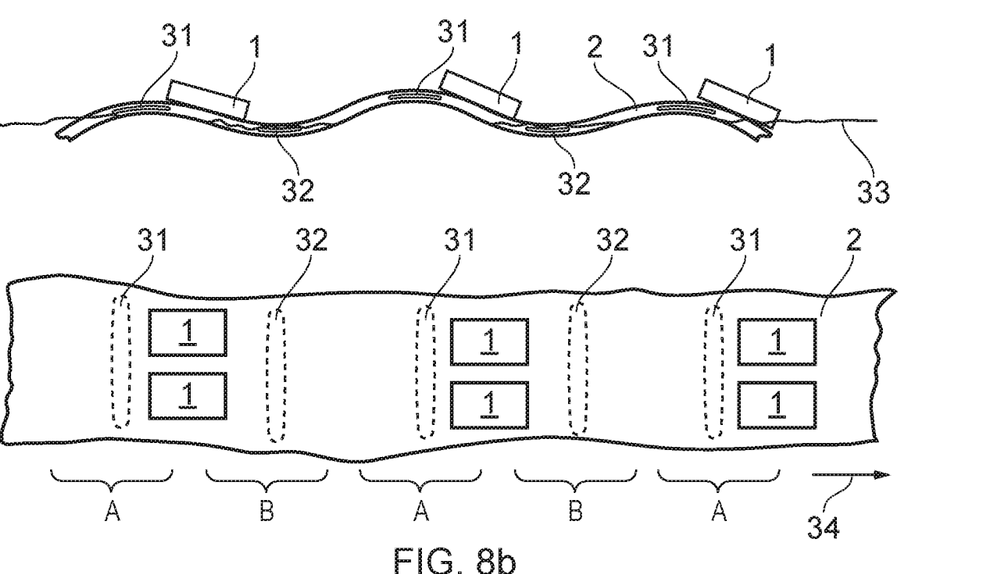

FIGS. 8a and 8b show another embodiment, wherein the mat 2 in a longitudinal direction 34 comprises sections A,B having alternating buoyancy and the modules 1 are arranged between the sections A,B. The top figure in each of FIGS. 8a and 8b is a side view of the mat 2 with the modules 1 arranged thereon. The mat 2 floats on a surface 33 of a body of water, such as the sea. (The illustration in FIGS. 8a and 8b is schematic for the purpose of clarity, and the relative sizes of the elements may not be representative for a real system. For example, the thickness of the mat 2 may be thinner in relation to the size of the modules, than what is indicated in FIGS. 8a and 8b.) The lower figure in each of FIGS. 8a and 8b shows a top view of the mat.

Each section in the first set of sections A has a density which is lower than 1 kg/dm$^3$ and each section in the second set of sections B has a density higher than 1 kg/dm$^3$. To achieve this, floatation elements or pockets 31 of low-density material is arranged in each of the sections A in the first set of sections. Additionally (or alternatively), the second set of sections B comprises weights 32 arranged therein or thereon. The weight 32 may be a material arranged in pockets in the mat 2, weights fixed to the mat 2, or it may be the material of the mat 2 itself in these sections being arranged with a higher density.

By this arrangement, it is possible to arrange the modules 1 at an angle to the horizontal, as indicated. Modules may be arranged on one side of the pockets 31 according to the most beneficial direction to the sun, or on both sides if desirable. Arranging the modules with an inclination to the horizontal may improve the performance and power generation of the modules 1. In addition, this can improve the self-cleaning effect and avoid build-up of contaminants on the module 1 surface.

Figure 9:
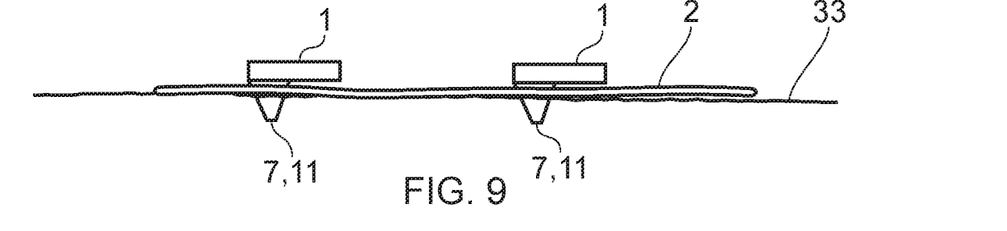
FIG. 9 shows a photovoltaic system according to an embodiment.

FIG. 9 shows another embodiment, in which the heat transfer elements 7 or the heat transfer plates 11 extend through the mat 2 and into the sea 33. Suitable openings in the mat 2 can be provided for this purpose. This enhances the heat transfer characteristics and thus the cooling of the laminate 12. This configuration may be advantageous, for example, in warm climates, to enhance the cooling of the modules 1.

Figure 10:
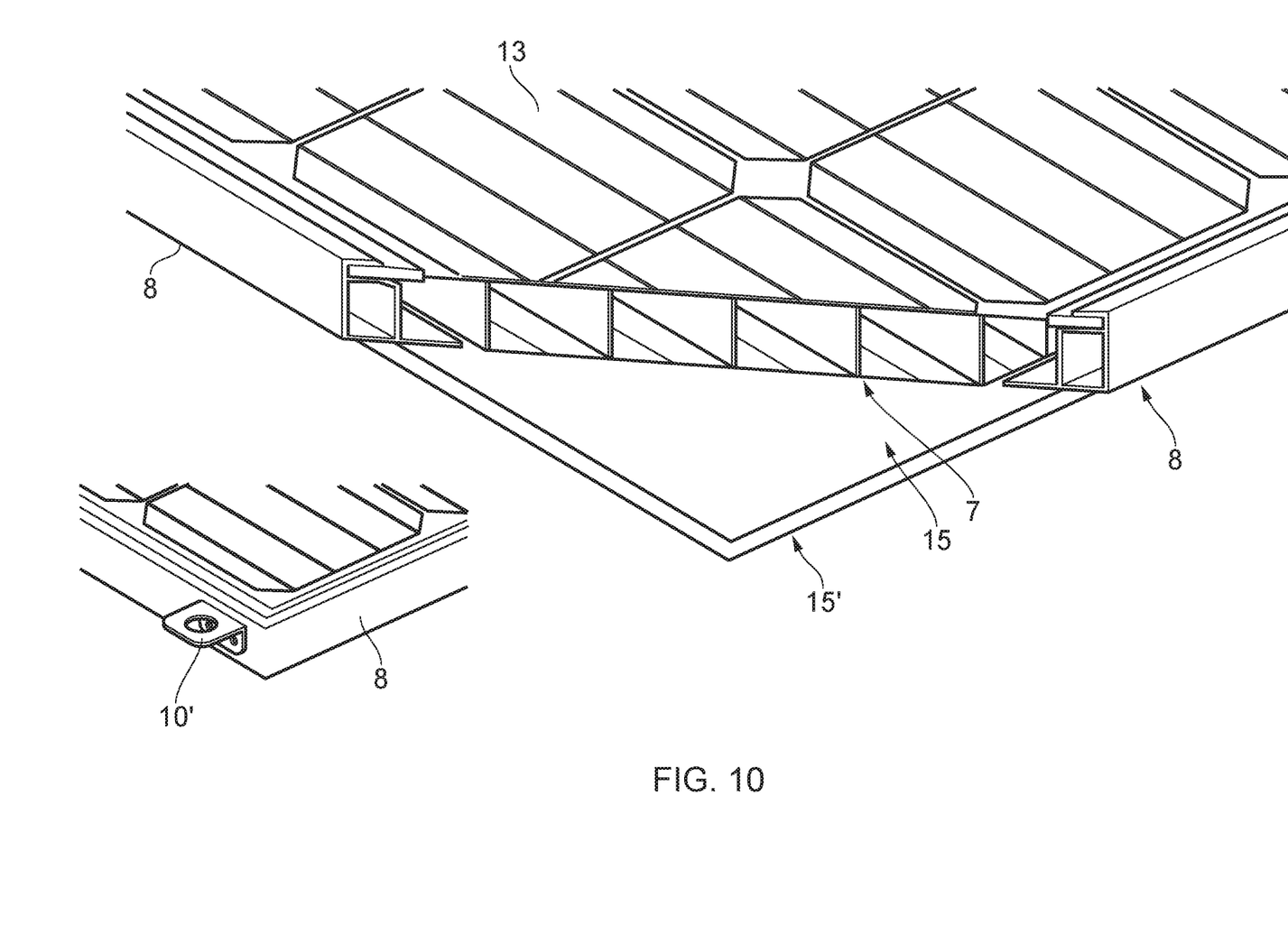
FIG. 10 shows aspects of a PV module.

FIG. 10 shows another embodiment. In this embodiment, the frame 8 comprises a back plate 15. The back plate 15 is arranged to rest against the mat 2 and is thermally connected to aluminium heat transfer elements 7, in the form of seam welded tubes or thin walled extrusions. As in the embodiment shown in FIG. 3, these extend transversely from the back plate 15 to a support plate (not visible in FIG. 10, but equivalent to support plate 14 shown in FIG. 11) which support the laminate 12. The back plate 15 is fixed to the frame 8 around its outer periphery 15'. Also visible in the cut-out in FIG. 10 is the fixation element 10' for fixing the frame 8 to the mat 2. Corresponding fixation elements 10' are arranged at the other corners of the frame 8. In this embodiment, the heat transfer elements 7 contribute to added structural strength and stiffness to the frame 8 and a suitable thickness of the heat transfer elements 7 and their arrangement (e.g. a pattern arrangement, as can be seen in FIG. 10) can be selected in order to achieve a desired/required strength and stiffness.

Figure 11:
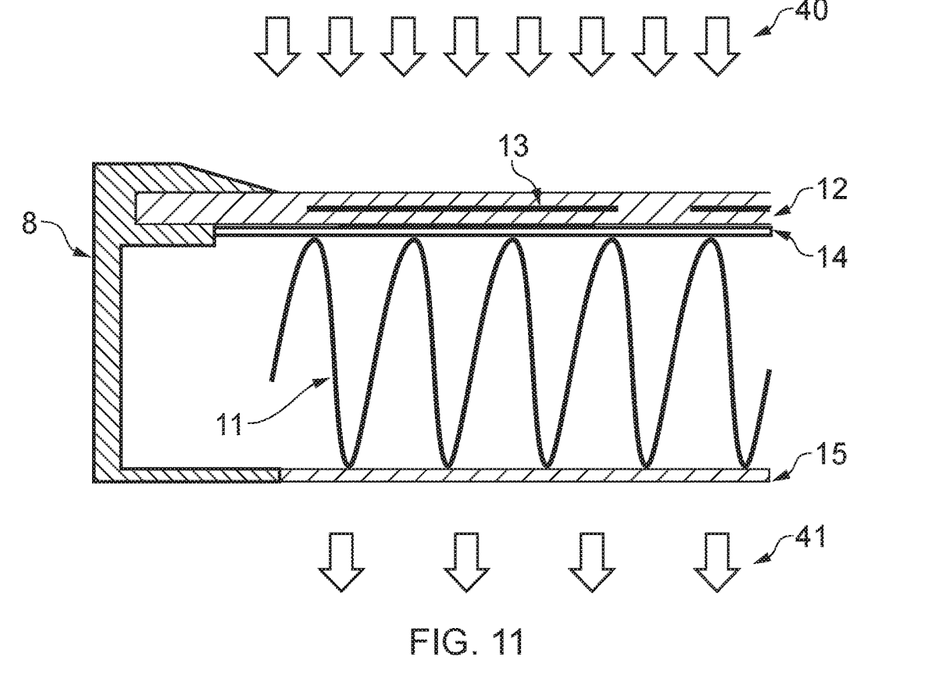
FIG. 11 shows a cross section of a PV module with a stiffening cooling element consisting of a corrugated profile.

FIG. 11 shows another embodiment. In this embodiment, the heat transfer plates 11 is arranged as corrugated cooling plates 11 arranged between the back plate 15 and the support plate 14. The middle plate 14 is arranged to support the laminate 12, while the back plate 15 is arranged at the back side of the frame 8 and arranged to rest against the mat 2. The corrugated cooling plates 11 may be brazed between plates 14 and 15, or fixed by other means. Also illustrated in FIG. 11 is the radiation influx 40 from the sun. This value may, depending on weather, geographical location, and other factors, be, for example, in the order of 1000 W/m$^2$. Also illustrated is the heat dissipation 41 from the back plate 15 to the mat 2 and/or the underlying and relatively cooler water. This ensures that the solar cells 13 are kept at an acceptably low operating temperature and consequently operate more efficiently (i.e. produce more electrical energy).

Figure 12A:
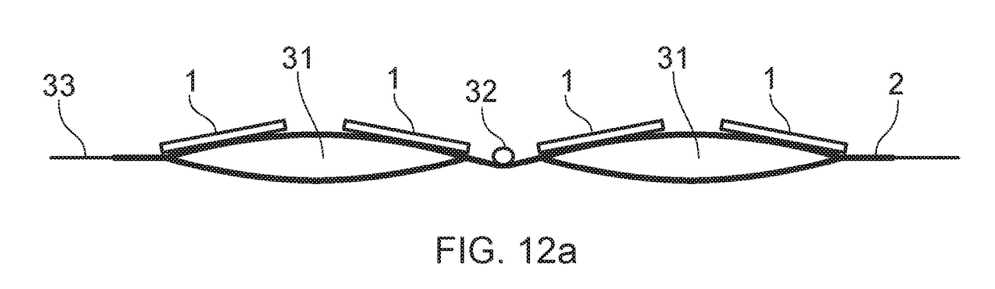
FIGS. 12a and 12b shows a photovoltaic system according to an embodiment.

FIG. 12a shows a side view of another embodiment, in which the pockets 31 are larger in size and filled with a buoyant liquid. By arranging the pockets 31 larger in size, it may, for example, be possible to use a liquid which has only slightly lower density than the water 33 on which the mat 2 floats. For example, pockets filled with freshwater may be used for a plant arranged on the sea. Weights 32 are arranged between the pockets 31, in this embodiment arranged on the mat 2 and not embodied within it. The weights 32 between the pockets 31 provides a depression in the mat 2 which may also be utilised as a drainage trench to lead water off the mat 2. The pockets 31 may be, for example, seam welded or stitched into the material of the mat 2, or the mat 2 with pockets 31 may be manufactured in a different manner.

Figure 12B:
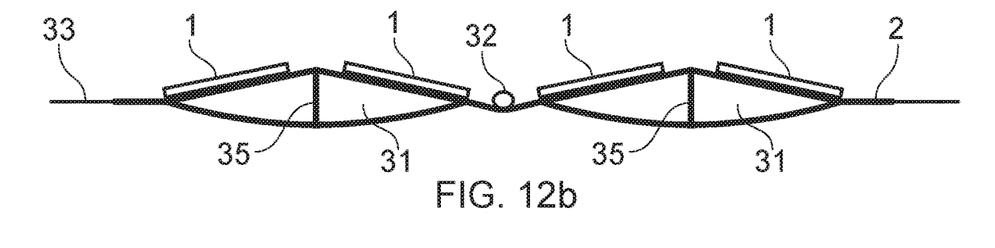

FIG. 12b shows a side view of an alternative embodiment in which the pockets 31 comprise spacer elements 35. The spacer elements 35 may be made of the same material as the mat 2, or of a different material. The spacer elements 35 can be arranged so as to define the shape of at least a part of the mat 2. In the embodiment shown in FIG. 12b, the spacer elements advantageously provides a more even surface for the mounting of the modules 1 on the top side of the mat 2.

Figure 13:
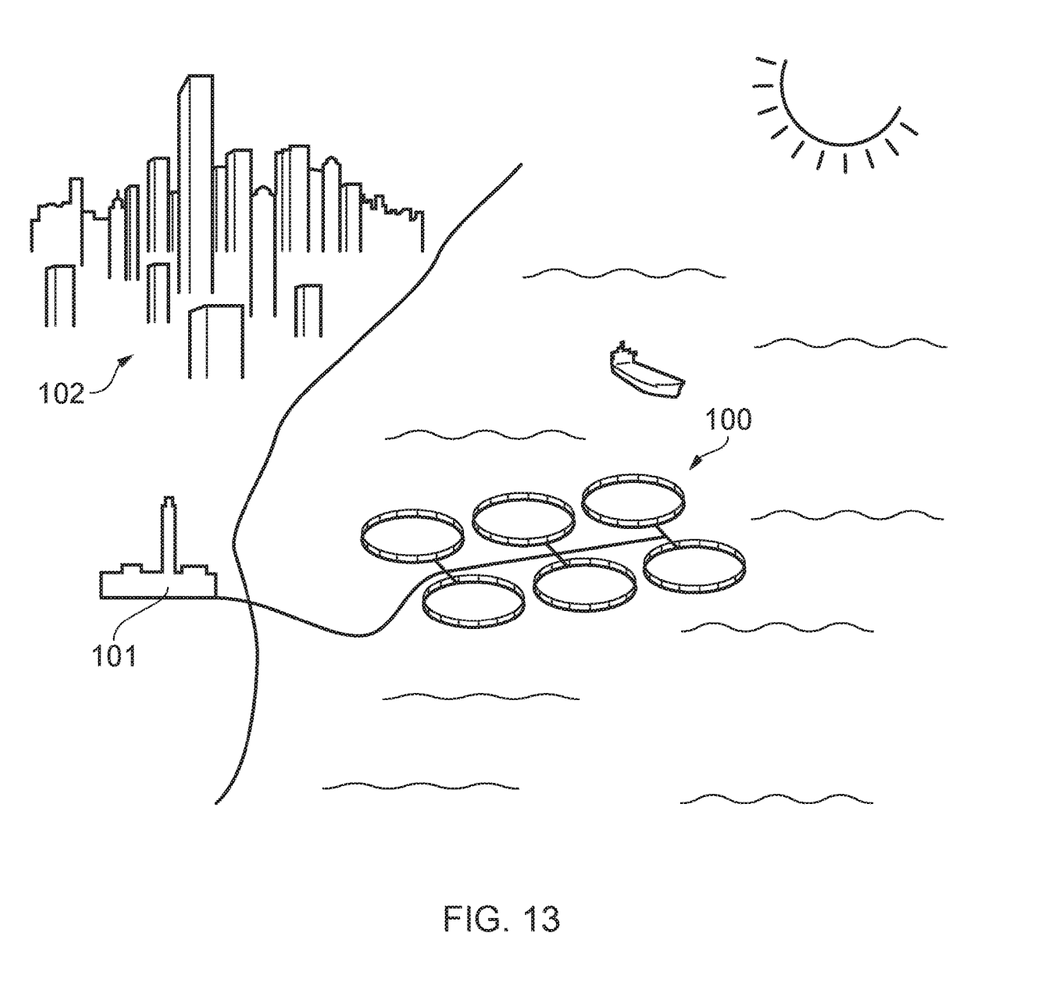
FIG. 13 illustrates a solar power plant according to an embodiment.

FIG. 13 illustrates an embodiment of an offshore photovoltaic power plant 100. The power plant 100 is arranged in a near-shore location near a densely populated area 101, such as a city. The power plant 100 comprises a plurality of units as shown in FIGS. 7a-c, however the individual units may be of a design and configuration according to any of the embodiments described above. In the embodiment shown in FIG. 13, six units are moored near-shore. The power plant 100 is electrically connected to an onshore power station 101, for distribution of the produced electric power to the city 101 and/or to other onshore consumers via an onshore grid (not shown). An embodiment such as that shown in FIG. 13 may therefore, for example, provide significantly more electrical power than what would be available from onshore solar power plants in view of the usually limited land area near densely populated areas.

Embodiments according to the present invention thus provide a novel and improved offshore photovoltaic power plant, and associated methods. According to some embodiments, installing such a power plant in harsh offshore environment can be made easier and more secure, at a reduced installation cost.

In some embodiments, the problem of reduced power production caused by heating of the solar cells can be reduced and a low cell operating temperature can be enabled, which increases the energy efficiency. The influence of waves on the installation, operation and structural integrity of the power plant may be lower than for known solutions, thus ensuring reliable and long life operation.

Embodiments of the invention can work well in combination with offshore wind parks where access to and from the windmills may be troublesome in rough sea. Solar PV also works well in combination with wind power due to overlapping power generation weather conditions during e.g. low wind and high solar radiation and vice versa. For such applications, the floating solar PV and offshore windmills may share a power cable infrastructure to land. A beneficial effect of an offshore power plant comprising an offshore photovoltaic power plant and at least one offshore wind power generator is that the mat 2 has a beneficial effect on the operation of the overall offshore installation and particularly on the wind power generators. Dampening of waves, similar to the effect of oil on troubled waters or wave dampening from e.g. grease ice can have a profound influence on working environment and/or the overall fatigue life of offshore constructions. This improves service life of the wind power generators and reduces inspection and maintenance needs, while also easing access to the wind power generators.

The invention claimed is:

1. A floating photovoltaic power plant comprising
a pliable mat,
a buoyant material or floatation elements fixed to the pliable mat or incorporated in the pliable mat,
the mat is configured to float on a surface of a body of water in direct contact with the surface of the body of water,
the mat having a plurality of photovoltaic modules fixed thereon,
each module laying with a back side thereof on top of the mat and each module comprising a plurality of solar cells encapsulated by a laminate,
wherein each module is arranged to be substantially stiff by means of a supporting frame and/or a stiffening element.

2. The floating photovoltaic power plant of claim 1, wherein the module is arranged to be substantially stiff by means of the stiffening element, and the stiffening element comprises at least one of: a stiffening core material, heat sink elements, heat sink plates, or a support plate.

3. The floating photovoltaic power plant of claim 1, wherein the mat comprises connectors fixing the modules to the mat.

4. The floating photovoltaic power plant of claim 1, comprising a heat transfer element arranged between the laminate and a back side of the module.

5. The floating photovoltaic power plant of claim 3, wherein the heat transfer element comprises corrugated cooling plates.

6. The floating photovoltaic power plant of claim 5, wherein the module comprises a first plate fixed to the laminate and a second plate forming a back side of the module, and wherein the corrugated cooling plates are arranged between the first plate and the second plate.

7. The floating photovoltaic power plant of claim 1, wherein the mat is fixed to a floatation element.

8. The floating photovoltaic power plant of claim 7, wherein the floatation element is an endless, elongated floatation element which surrounds the mat.

9. The floating photovoltaic power plant of claim 1, wherein an elongate string of interconnected modules is fixed on the pliable mat.

10. A method of installing a floating photovoltaic power plant, comprising the step of deploying the floating photovoltaic power plant of claim 1 onto the body of water.

11. The method of claim 10, wherein the step of deploying the floating photovoltaic power plant is carried out from a vessel.

12. The method of claim 11, further comprising transporting the floating photovoltaic power plant folded and stacked onboard the vessel.

13. The method of claim 10, wherein the step of deploying the floating photovoltaic power plant is carried out from a land-based location.

14. The floating photovoltaic power plant of claim 2, wherein the mat comprises connectors fixing the modules to the mat.

15. The floating photovoltaic power plant of claim 2, comprising a heat transfer element arranged between the laminate and a back side of the module.

16. The floating photovoltaic power plant of claim 3, comprising a heat transfer element arranged between the laminate and a back side of the module.

17. The floating photovoltaic power plant of claim 5, wherein the mat is fixed to a floatation element.

18. The floating photovoltaic power plant of claim 3, wherein an elongate string of interconnected modules is fixed on the pliable mat.

19. The floating photovoltaic power plant of claim 6, wherein an elongate string of interconnected modules is fixed on the pliable mat.

20. The floating photovoltaic power plant of claim 7, wherein an elongate string of interconnected modules is fixed on the pliable mat.

21. The floating photovoltaic power plant of claim 1, wherein each module comprises a frame around the plurality of solar cells.

22. The floating photovoltaic power plant of claim 1, wherein the plurality of solar cells within each module are fixed such that there is no relative movement between the plurality of solar cells within each module, but relative movement between each module is possible.

23. The floating photovoltaic power plant of claim 1, wherein the bending resistance between any of the plurality of solar cells within any one of the plurality of modules is greater than the bending resistance between modules.

* * * * *